(12) United States Patent
Kauderer et al.

(10) Patent No.: US 9,810,123 B2
(45) Date of Patent: Nov. 7, 2017

(54) EXHAUST GAS AFTERTREATMENT DEVICE WITH INJECTION SECTION

(71) Applicant: Eberspächer Exhaust Technology GmbH & Co. KG, Neunkirchen (DE)

(72) Inventors: Alexander Kauderer, Kuchen (DE); Tobias Wolf, Köngen (DE); Kirill Karelin, Böblingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 187 days.

(21) Appl. No.: 14/933,417

(22) Filed: Nov. 5, 2015

(65) Prior Publication Data
US 2016/0131007 A1    May 12, 2016

(30) Foreign Application Priority Data

Nov. 6, 2014 (DE) .................. 10 2014 222 698

(51) Int. Cl.
*B01D 50/00* (2006.01)
*F01N 3/20* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC .. F01N 3/2893; F01N 3/2066; F01N 13/0093; F01N 3/021; F01N 3/103; F01N 2240/20; F01N 2610/1453
(Continued)

(56) References Cited

U.S. PATENT DOCUMENTS 5,426,269 A * 6/1995 Wagner .................. F01N 1/02
181/232
6,722,123 B2 * 4/2004 Liu ................. B01F 3/04049
60/286
(Continued)

FOREIGN PATENT DOCUMENTS

JP       2012 225316 A     11/2012
WO     2010/146285 A1     12/2010
(Continued)

*Primary Examiner* — Tom P Duong
(74) *Attorney, Agent, or Firm* — McGlew and Tuttle, P.C.

(57) ABSTRACT

An exhaust system injection section (10) includes an exhaust gas flow channel (19), a laterally arranged injector connection (21), with a fluid introducing injector (22) and an injection chamber (24) formed in the channel, which is delimited by a perforated first separating wall (25), arranged in the channel upstream of the injector connection, and a perforated second separating wall (26) arranged in the channel downstream of the injector connection. To provides intensive mixing of the injected fluid with the exhaust gas flow a perforation (29) of the first separating wall (25) is configured so that exhaust gas largely flows eccentrically through the first separating wall (25) with respect to a longitudinal center axis (23) of the channel and a perforation (31) of the second separating wall (26) is configured so that exhaust gas largely flows concentrically through the second separating wall (26) with respect to the longitudinal center axis (23).

21 Claims, 4 Drawing Sheets (51) Int. Cl.
*F01N 3/28* (2006.01)
*F01N 13/00* (2010.01)
*B01D 53/94* (2006.01)
*B01F 5/04* (2006.01)
*B01F 5/06* (2006.01)
*B01F 3/04* (2006.01)
*F01N 3/10* (2006.01)
*F01N 3/021* (2006.01)

(52) U.S. Cl.
CPC ........ *B01F 3/04049* (2013.01); *B01F 5/0473* (2013.01); *B01F 5/0608* (2013.01); *F01N 3/2892* (2013.01); *F01N 13/0093* (2014.06); *F01N 13/0097* (2014.06); *F01N 3/021* (2013.01); *F01N 3/103* (2013.01); *F01N 2240/20* (2013.01); *F01N 2610/02* (2013.01); *F01N 2610/1453* (2013.01); *Y02T 10/24* (2013.01)

(58) Field of Classification Search
USPC .................................................. 422/177, 176
See application file for complete search history.

(56) References Cited

U.S. PATENT DOCUMENTS

| | | | |
|---|---|---|---|
| 8,661,792 B2* | 3/2014 | Greber | F01N 3/2066 60/286 |
| 2009/0000287 A1 | 1/2009 | Blaisdell et al. | |
| 2011/0167810 A1* | 7/2011 | Lebas | B01F 3/04049 60/324 |
| 2014/0033686 A1 | 2/2014 | Fischer et al. | |
| 2014/0044603 A1* | 2/2014 | Greber | F01N 3/2066 422/171 |
| 2015/0110681 A1* | 4/2015 | Ferront | F01N 3/2892 422/168 |

FOREIGN PATENT DOCUMENTS

| | | |
|---|---|---|
| WO | 2012/089290 A1 | 7/2012 |
| WO | 2014/195393 A1 | 12/2014 |
| WO | 2015/059145 A1 | 4/2015 |

* cited by examiner

EXHAUST GAS AFTERTREATMENT DEVICE WITH INJECTION SECTION

CROSS REFERENCE TO RELATED APPLICATIONS

This application claims the benefit of priority under 35 U.S.C. §119 of German Patent Application 10 2014 222 698.8 filed Nov. 6, 2014, the entire contents of which are incorporated herein by reference.

FIELD OF THE INVENTION

The present invention relates to an injection section of an exhaust system for an internal combustion engine with a channel for conducting an exhaust gas flow, an injector connection arranged laterally on the channel, on which an injector for introducing a fluid into the exhaust gas flow can be connected and an injection chamber formed in the channel in the region of the injector connection, which on one side is delimited by a perforated separating wall through which exhaust gas can flow and which with respect to the exhaust gas flow is arranged in the channel upstream of the injector connection and on the other side by a perforated second separating wall through which exhaust gas can flow and which with respect to the exhaust gas flow is arranged in the channel downstream of the injector connection. The invention additionally relates to an exhaust gas aftertreatment device for an exhaust system of an internal combustion engine equipped with such an injection section.

BACKGROUND OF THE INVENTION

A generic injection section is disclosed in PCT/EP2014/072554 (date of application Oct. 21, 2014). The injection section comprises a channel for conducting an exhaust gas flow and an injector connection arranged laterally on the channel, to which an injector for introducing a fluid, that is a liquid or a gas, into the exhaust gas flow, can be connected. Furthermore, an injection chamber is formed in the channel in the region of the injector connection, which on the one hand is delimited by a first separating wall which with respect to the exhaust gas flow is arranged in the channel upstream of the injector connection, which is perforated and through which exhaust gas can flow and on the other hand by a second separating wall which with respect to the exhaust gas flow is arranged in the channel downstream of the injector connection, which is perforated and through which exhaust gas can flow. With this injector section, a perforation of the first separating wall is configured so that when the first separating wall is subjected to a through-flow, it creates at least two exhaust gas part flows within the injection chamber, which form two opposing flow vortices. Furthermore, through the configuration of the perforation of the first separating wall it is achieved that both the exhaust gas partial flows flow separately proximally with respect to a channel wall laterally delimiting the injection chamber and flow jointly distally with respect to the channel wall. Intensive swirling within the injection chamber is thereby achieved. At the same time, a comparatively long dwell time for the exhaust gas within the injection chamber is achieved. An improved mixing-through, between exhaust gas and introduced liquid or introduced gas, can thereby be achieved. Provided a liquid is introduced, improved evaporation of the liquid can be additionally achieved through this measure.

WO 2010/146285 A1 discloses an exhaust gas aftertreatment device in the form of an SCR-system, SCR standing for selective catalytic reduction. The SCR-system comprises a tubular housing for conducting an exhaust gas flow, which in an outlet section contains an SCR-catalytic converter. The housing additionally comprises an inlet section, which with respect to the exhaust gas flow is arranged upstream of the outlet section and which contains an oxidation catalytic converter. Axially between the inlet section and the outlet section an injection section is arranged, wherein a further housing section that is integrally formed on the inlet section, defines a channel of the injection section which likewise serves for conducting the exhaust gas flow. In the injection section, an injector connection is laterally arranged on the channel on which an injector for laterally injecting or introducing, via a nozzle, a liquid or of a gas in the exhaust gas flow is connected. In the channel of the injection chamber, an injection chamber is formed in the region of the injector connection which on the one hand is delimited by a first separating wall which with respect to the exhaust gas flow is arranged in the channel upstream of the injector connection and which is perforated and through which exhaust gas can flow and on the other hand by a second separating wall which with respect to the exhaust gas flow is arranged in the channel downstream of the injector connection and which is perforated and through which exhaust gas can flow. With the SCR-system, the two separating walls are configured or formed in conjunction with their perforations so that during the operation of the exhaust system a spin or vortex or rotational flow is formed, in the case of which the entire exhaust gas flow rotates about the longitudinal center axis of the channel. Because of this it is achieved that a flow path in the injection chamber, which the exhaust gas flow follows from the perforation of the first separating wall to the perforation of the second separating wall, is by at least 20% longer than an axial distance between inlet section and outlet section. A mixing section is thus created, in which an injected liquid can evaporate and become mixed-through with the exhaust gas flow.

In the case of an SCR-system, the injected liquid is a reduction agent. Preferably, a watery urea solution, which is ultimately converted into ammonia and carbon dioxide by means of thermolysis and hydrolysis is currently preferred in order to convert nitrogen oxides deposited in the SCR-catalytic converter into nitrogen and water. Of decisive importance for the efficiency of such an SCR-system on the one hand is as complete as possible an evaporation of the reduction agent introduced in liquid form. On the other hand, as intensive as possible a mixing-through of the evaporated reduction agent with the exhaust gas flow also has to be achieved.

Alternatively, with modern SCR-systems, a gaseous reduction agent can also be atomised-in, which for example is gaseous ammonia. Storage in this case can take place in the form of solids, which are evaporated for example by means of electrically supplied heat in order to generate the gaseous ammonia. In the case of these so-called Amminex systems, the ammonia is thus directly available in the exhaust gas flow so that intensive mixing-through with the exhaust gas flow is merely required since the evaporation already takes place in advance, outside the exhaust gas flow.

SUMMARY OF THE INVENTION

The present invention deals with the problem of providing an improved embodiment for an injection section of the type mentioned above with respect to an exhaust gas aftertreatment device equipped with such, which is characterized in particular by efficient mixing-through for the injected fluid with the exhaust gas flow and which is additionally characterized by an efficient evaporation effect, provided the injected fluid is a liquid.

According to the present invention an injection section is provided for an exhaust system of an internal combustion engine with a channel for conducting an exhaust gas flow, with an injector connection that is arranged laterally on the channel, on which an injector for introducing a fluid into the exhaust gas flow can be connected, and with an injection chamber that is formed in the channel in the region of the injector connection. The injection chamber on one side is delimited by a perforated first separating wall through which exhaust gas can flow and which with respect to the exhaust gas flow is arranged in the channel upstream of the injector connection and on the other side by a perforated second separating wall through which exhaust gas can flow and which with respect to the exhaust gas flow is arranged in the channel downstream of the injector connection.

Intensive mixing-through of the injected fluid with the exhaust gas flow is obtained when a perforation configuration of the first separating wall is such that the first separating wall with respect to a longitudinal center axis of the channel has exhaust gas flow passing through largely eccentrically. A perforation configuration of the second separating wall is such that the second separating wall, with respect to the longitudinal center axis of the channel, can have exhaust gas flow through largely concentrically.

The invention is based on the general idea of creating an intensive flow deflection within the injection chamber through a suitable selection and/or arrangement of a perforation configuration of the first separating wall and a perforation configuration of the second separating wall, which ensures sufficient mixing-through and if appropriate evaporation of the injected fluid. On the one hand, this is achieved in that the perforation configuration of the first separating wall is configured so that the first separating wall with respect to a longitudinal center axis of the channel, which the channel has at least in the region of the injection chamber, can be exclusively or at least substantially be flowed through by the exhaust gas eccentrically, so that an exhaust gas flow exclusively or at least substantially eccentrically enters the injection chamber through the first separating wall. Through this inflow of the exhaust gas in the injection chamber which mainly takes place eccentrically, the exhaust gas flow has an entering main part. The entering main part of the exhaust gas flow at any rate comprises more than 50% of the entire volume flow rate of the exhaust gas flow. Preferentially, the entering main part of the exhaust gas flow comprises at least 75% and in particular at least 90% of the entire volume flow rate of the exhaust gas flow. It is likewise conceivable that the entering main part of the exhaust gas flow makes up 100% of the volume flow rate of the exhaust gas flow so that the entering main part is formed by the entire exhaust gas flow. This is achieved for example by a correspondingly largely or exclusively eccentric arrangement of the perforation configuration in the first separating wall.

On the other hand, the intensive flow deflection for the efficient mixing-through respectively evaporation in the injection chamber is achieved in that the perforation configuration of the second separating wall is configured so that the second separating wall with respect to the longitudinal center axis of the channel can be exclusively or at least substantially concentrically flowed through by exhaust gas so that an exhaust gas flow exclusively or at least substantially exists axially through the second separating wall from the injection chamber. Through this outflow of the exhaust gas from the injection chamber which mainly takes place eccentrically, the exhaust gas comprises an exiting main part. The exiting main part of the exhaust gas flow at any rate comprises more than 50% of the entire volume flow rate of the exhaust gas flow. Preferentially, the exiting main part of the exhaust gas comprises at least 75% and in particular at least 90% of the entire volume flow rate of the exhaust gas flow. It is likewise conceivable that the exiting main part of the exhaust gas flow makes up 100% of the volume flow rate of the exhaust gas flow so that the exiting main part is formed through the entire exhaust gas flow. To this end, this perforation configuration is largely or exclusively concentrically arranged in the second separating wall.

The respective entering or exiting main part of the exhaust gas flow in this case can be single-part or multi-part depending on the perforation configuration of the respective separating wall, either consist of a single flow or of multiple part flows. Preferentially, the eccentrically entering main part is multi-part, while the concentrically exiting main flow is single-part. Provided the respective main part of the exhaust gas flow is not formed by the entire exhaust gas flow, an entering secondary part or an exiting secondary part of the exhaust gas flow also exists, wherein it can be also provided here that the respective secondary part can be single-part or multi-part.

Through the design according to the invention it is thus achieved that the exhaust gas flow with respect to the longitudinal center axis of the channel mainly enters the injection chamber eccentrically and mainly exists the injection chamber concentrically. Because of this, the exhaust gas flow within the injection chamber has to be deflected and converged multiple times from an eccentric inflow region into a concentric outflow region. In the process, intensive mixing-through with adequate dwell-duration for intensive evaporation occurs.

In addition to an exclusively eccentric or concentric through-flow of the respective separating wall, a substantially eccentric or concentric through-flow of the respective separating wall is also possible, which corresponds to a largely or preferably eccentric or concentric through-flow of the respective separating wall. "Substantially eccentric" through-flow of the first separating wall is to thus mean a through-flow of the first separating wall during which more than 50%, preferentially at least 75% and in particular at least 90% of the entire volume flow rate of the exhaust gas flow flowing through the first separating wall eccentrically flows through the first separating wall. "Substantially concentric" through-flow of the second separating wall then is to mean a through-flow of the second separating wall, during which more than 50%, preferentially at least 75% and in particular at least 90% of the entire volume flow rate of the exhaust gas flow flowing through the separating wall concentrically flows through the second separating wall. Preferred however is an embodiment, with which the first separating wall can only be flowed through eccentrically, i.e. exclusively comprises an eccentric perforation configuration, and/or with which the second separating wall can only be flowed through concentrically, i.e. exclusively comprises a concentric perforation configuration.

As mentioned, the injector connection is laterally attached on the channel. Because of this, with corresponding arrangement of the injector, in particular a lateral injection of the respective fluid can be achieved. Upon a lateral injection of the fluid, a main injection direction relative to an axial direction of the channel is inclined, preferentially in an angular range from 60° to 120°, in particular in an angular range from 85° to 95° and practically by approximately 90°.

According to a preferred embodiment, the perforation configuration of the first separating wall can be additionally configured so that the first separating wall with respect to the longitudinal center axis of the channel can be preferably or exclusively axially flowed through by exhaust gas, so that via the through-flow of the perforation configuration itself no flow deflection worth mentioning or none at all takes place. Altogether, the entering main part of the exhaust gas flow can thus enter the injection chamber eccentrically and axially.

Additionally or alternatively it can be provided that the perforation configuration of the second separating wall is additionally configured so that the second separating wall with respect to the longitudinal center axis of the channel can be preferably or exclusively axially flowed through by exhaust gas so that through the through-flow of the perforation configuration itself, no flow deflection worth mentioning or none at all takes place. Altogether, the exiting main part of the exhaust gas flow can thus concentrically and axially exit the injection chamber.

According to an advantageous further development it is provided that the through-flow of the respective separating wall within the respective perforation configuration exclusively takes place axially. A flow deflection thus takes place in each case exclusively upstream and/or downstream of the respective separating wall.

According to an advantageous embodiment, the eccentric perforation configuration of the first separating wall in a projection that is parallel to the longitudinal center axis of the channel can be completely arranged outside the concentric perforation configuration of the second separating wall. This means that the perforation configurations of the two separating wall do not overlap one another in an axial projection so that a deflection-free axial through-flow of the injection chamber is not possible. The multiple deflection for the entire exhaust gas flow is thus enforced.

According to an advantageous embodiment, the second separating wall can, axially aligned with the perforation configuration of the first separating wall, comprise a baffle surface arranged eccentrically with respect to the longitudinal center axis of the channel. Accordingly, the exhaust gas flow entering the injection chamber axially impacts the baffle surface, on which the flow deflection takes place. The baffle surface can simultaneously serve as evaporation surface for injected liquid, which can precipitate on the baffle surface. By the entering exhaust gas flow intensively striking the baffle surface, efficient evaporation is created in the process.

Particularly advantageous is a further development, in which the second separating wall is convexly curved towards the first separating wall. Since the entering exhaust gas flow eccentrically strikes the convexly curve second separating wall, in particular the aforementioned baffle surface, a deflection of the flow radially to the outside, i.e. in the direction of a channel wall laterally delimiting the injection chamber, takes place. On the same a further deflection of the flow in circumferential direction of the channel takes place. Altogether, intensive mixing-through can thus be created.

In another embodiment, the perforation configuration of the first separating wall can comprise at least one eccentrically arranged opening, which is enclosed by a collar projecting into the injection chamber. The collar brings about an axial flow orientation. Furthermore, the collar can be configured as a nozzle and have a cross section that converges in flow direction. On a side facing the injector connector, the collar, with respect to its length measured in the axial direction, can be dimensioned so large that a spray cone of the fluid sprayed in by the injector strikes the collar from the outside, but cannot exit the injection chamber through the eccentric opening.

Additionally or alternatively it can be provided that the perforation configuration of the first separating wall comprises at least one eccentrically arranged opening which is configured as elongated hole extending in circumferential direction of the channel. In this way, a comparatively large opening cross section can be realized for the eccentric opening. Preferably, the abovementioned features are employed combined so that the opening configured as elongated hole can additionally comprise a collar projecting into the injection chamber.

Preferably it is provided that the perforation configuration of the first separating wall is exclusively formed by two eccentrically arranged openings, namely by a first opening and a second opening, which with respect to the longitudinal center axis are located diametrically opposite one another. The two openings can each be equipped with a collar that projects into the injection chamber and/or be each configured as an elongated hole extending in circumferential direction. Through the two openings, the flow in the injection chamber is also deflected in the circumferential direction, which favors intensive mixing-through.

It is particularly advantageous when the two openings with the injector connection lie in a longitudinal center plane in which the longitudinal center axis is also located. In this case, the one eccentric opening is then arranged proximally with respect to the injector connection and can also be called proximal opening, while the other eccentric opening is then arranged distally with respect to the injector connection, and can also be called distal opening. Exhaust gas, which enters the injection chamber through the distal opening, is then inevitably deflected in the injection chamber in the direction of the injector connection so that the exhaust gas in this region of the injection chamber flows against the injected fluid. This leads to intensive mixing-through.

Particularly advantageous is a further development, in which the distal opening has a larger opening cross section than the proximal opening. Consequently a part of the gas flow, which in the injection chamber flows against the injected fluid, is enlarged, which likewise improves the mixing-through. At the same time, an increased flow velocity is achieved at the proximal opening through the reduced opening cross section, with which the exhaust gas flows through the proximal opening into the injection chamber. This supports a deflection of the injected fluid against the second separating wall, in particular against the baffle surface of the same.

Furthermore, it can also be provided here that the proximal opening and the distal opening are each enclosed by a collar, which with respect to their length can be adapted to the spray cone. Practically, the collar of the distal opening of at least one side facing the injector connection is then longer than the collar of the proximal opening.

According to another embodiment, the perforation configuration of the second separating wall can comprise at least one centrally arranged opening, which is enclosed by a projecting collar orientated away from the injection chamber. Here, too, an axial orientation of the exhaust gas flow exiting the injection chamber can be realized. The collar, here, can also have a nozzle contour which is characterized by a cross section that converges in the flow direction.

According to another embodiment, it can be provided that the perforation configuration of the second separating wall is exclusively formed by a single concentrically arranged central opening. In this way, the entire exhaust gas flow is forced to leave the injection chamber through this one central opening.

In another embodiment, a deflection chamber can be formed in the channel with respect to the exhaust gas flow downstream of the injection chamber, which on the one hand is delimited with respect to the exhaust gas flow upstream by the second separating wall and on the other hand by a third separating wall that is perforated and can be flowed through by exhaust gas which with respect to the exhaust gas flow is arranged downstream in the channel. With the help of this deflection chamber, a further flow deflection is enforced which favors the homogenization of the injected fluid with the exhaust gas flow. In addition, further evaporation of the injected liquid if appropriate can also be favored in the deflection chamber, in particular, the third separating wall in its central region can serve as baffle wall for this purpose to support the evaporation of liquid drops carried along in the exhaust gas flow.

Particularly advantageous in this case is a further development, in which a perforation configuration of the third separating wall is such that the third separating wall with respect to the longitudinal center axis of the channel can be flowed through by exhaust gas eccentrically and exclusively or substantially, axially. This means that the exhaust gas from the injection chamber through the second separating wall flows centrally into the deflection chamber and through the perforation configuration of the third separating wall flows eccentrically and at least largely axially out of the deflection chamber. As a consequence, an intensive flow deflection also has to take place in the deflection chamber, which is accompanied by intensive mixing-through.

Practically, the perforation configuration of the third separating wall comprises at least one eccentrically arranged opening. The same can optionally comprise a projecting collar that is orientated away from the deflection chamber. The collar leads to an axial orientation of the flow exiting the deflection chamber. Furthermore, the collar can be configured as a nozzle and have a cross section that converges in flow direction. Additionally or alternatively, the respective eccentric opening of the third separating wall can be optionally configured as elongated hole extending in circumferential direction of the channel, so that here, too, with eccentric arrangement, a comparatively large opening cross section can be achieved.

Provided that the perforation configuration of the third separating wall comprises multiple eccentrically arranged openings, these are preferentially arranged evenly distributed in the circumferential direction of the channel.

In another embodiment, the perforation configuration of the third separating wall can be additionally be such that the third separating wall with respect to the longitudinal center axis of the channel can also be concentrically flowed through by exhaust gas. Practically, in this case, a part of the exhaust gas flow concentrically flowing through the separating wall is smaller than a part of the exhaust gas flow eccentrically flowing through the third separating wall. For example, the part that concentrically flows through the third separating wall is maximally a third, preferentially maximally a fourth of the entire exhaust gas flow, in each case based on the volume flow rate. The concentrically arranged perforation configuration leads to a significant reduction of the through-flow resistance of the injection section. In addition, the concentric through-flow capability of the third separating wall supports homogenisation of the exhaust gas flow downstream of the third separating wall.

According to another advantageous embodiment, the injection section can be equipped with a pipe piece, which contains the channel and the injection chamber and, so far as present, also the deflection chamber. In the pipe piece, the first separating wall and the second separating wall are thus arranged. If the deflection chamber is additionally provided, the third separating wall is also arranged in the pipe piece. Furthermore, the pipe piece comprises the injector connection. With respect to an exhaust gas aftertreatment device, in which the injection section can be installed, the pipe piece is configured as a separate component so that the injection section with respect to the exhaust gas aftertreatment device forms a separate unit. For example, the injection section can thus be designed as a pre-assemblable assembly, which if required can be installed in a corresponding exhaust gas aftertreatment device.

An exhaust gas aftertreatment device according to the invention, which is suitable for use in an exhaust system of an internal combustion engine, comprises a tubular housing for conducting an exhaust gas flow, which in an outlet section contains an SCR-catalytic converter. In addition, the exhaust gas aftertreatment device is equipped with an injection section of the type described above, which with respect to the exhaust gas flow is arranged upstream of the SCR-catalytic converter. Practically, the injection section in this case forms a part of the housing. In particular, the pipe piece of the injection section mentioned above forms such a housing part. In addition, the housing can comprise an inlet section which with respect to the exhaust gas flow is arranged upstream of the injection section, and therein contain a particle filter. In addition or alternatively, an oxidation catalytic converter can be arranged in the inlet section. Provided that both an oxidation catalytic converter and also a particle filter are arranged in the inlet section, the oxidation catalytic converter is located upstream of the particle filter. Additionally or alternatively, a calming chamber can be formed in the outlet section between the injection section and the SCR-catalytic converter, which can ultimately be formed by an axial distance between the injection section and the SCR-catalytic converter. This axial distance in this case can be approximately or at least identical in size as a diameter of the preferentially cylindrical housing. The SCR-catalytic converter can be formed by multiple SCR-catalytic converter elements, which in flow direction are arranged one behind the other.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
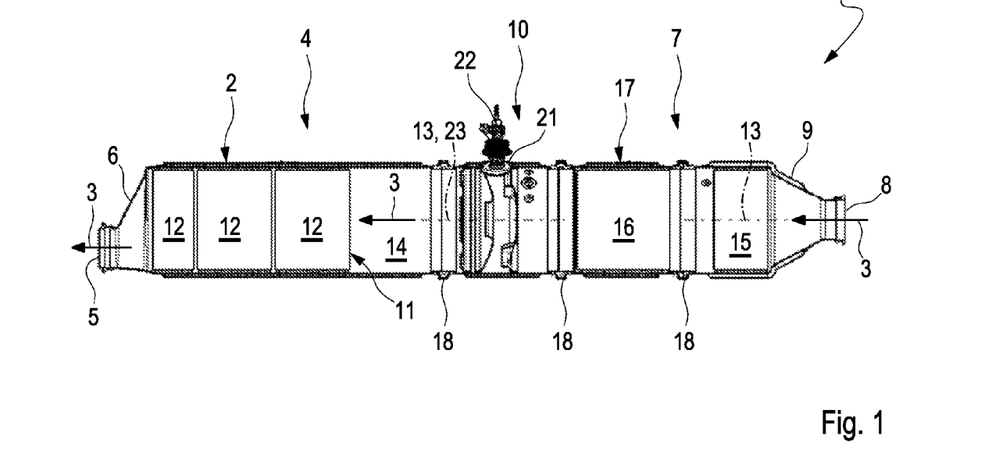
FIG. 1 is a longitudinal section of an exhaust gas aftertreatment device.
Figure 2:
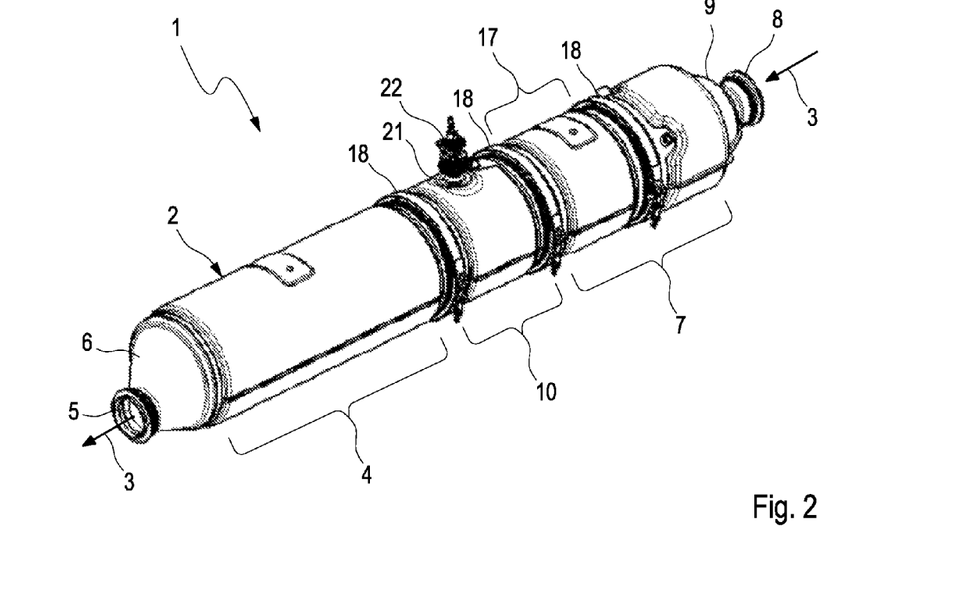
FIG. 2 is an isometric view of the exhaust gas aftertreatment device.

Referring to the drawings, according to FIGS. 1 and 2, an exhaust gas aftertreatment device 1, which is suitable for use in an exhaust system of an internal combustion engine, comprises a tubular housing 2 for conducting an exhaust gas flow 3 indicated by arrows. The housing 2 in this case comprises an outlet section 4, which comprises an outlet 5 on an outlet funnel 6, and an inlet section 7, which comprises an inlet 8 on an inlet funnel 9. Between inlet section 7 and outlet section 4 an injection section 10 is arranged, which will still be explained in more detail in the following and which serves for introducing a fluid, that is a liquid or a gas, into the exhaust gas flow 3. With respect to the flow direction of the exhaust gas flow 3, the injection section 10 is arranged between the outlet section 4 and the inlet section 7. In the outlet section 4, an SCR-catalytic converter 11 is arranged, which in the example of FIG. 1 comprises three SCR-elements 12 arranged axially one behind the other. The axial direction in this case refers to a longitudinal center axis 13 of the housing 2. Noticeably, an axial distance is provided between the SCR-catalytic converter 11 and the injection section 10, as a result of which between injection section 10 and SCR-catalytic converter 11 a calming chamber 14 is formed in the housing 2. In the example, the axial distance for forming the calming chamber 14 is approximately identical in size as a diameter of the housing 2 that is circular in cross section. In the inlet section 7, an oxidation catalytic converter 15 is arranged. Between the injection section 10 and the oxidation catalytic converter 15, a particle filter 16 is additionally arranged in the inlet section 7. The exhaust gas aftertreatment device 1 introduced here has a modular construction, which is characterized in that the injection section 10 and a section 17 of the housing 2 containing the particle filter 16 are incorporated in the housing 2 with the help of clamp connections 18. In this way it is possible for example to remove the section 17 that is equipped with the particle filter 16 for example for maintenance purposes transversely to the longitudinal center axis 13 or even omit the same for another configuration of the exhaust gas aftertreatment device 1. Likewise, the injection section 10 can be removed from the housing 2 for maintenance purposes transversely to the longitudinal center axis 13.

Figure 3:
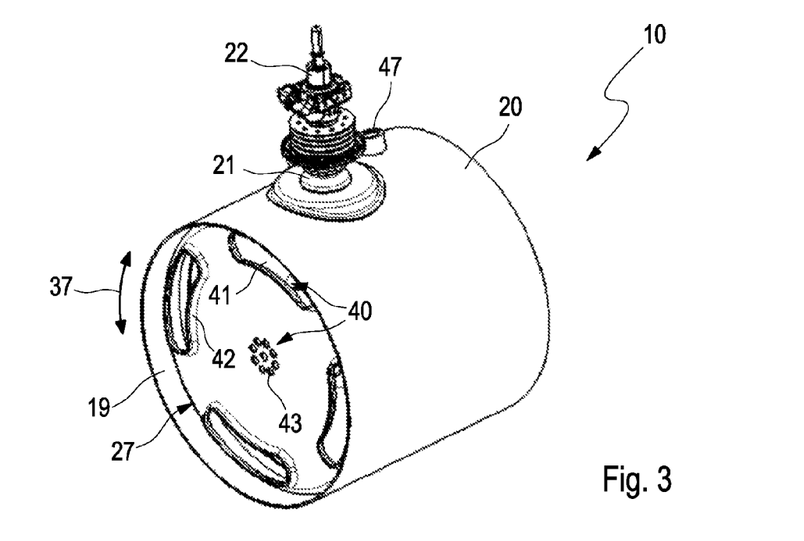
FIG. 3 is an isometric view of an injection section of the exhaust gas aftertreatment device.
Figure 4:
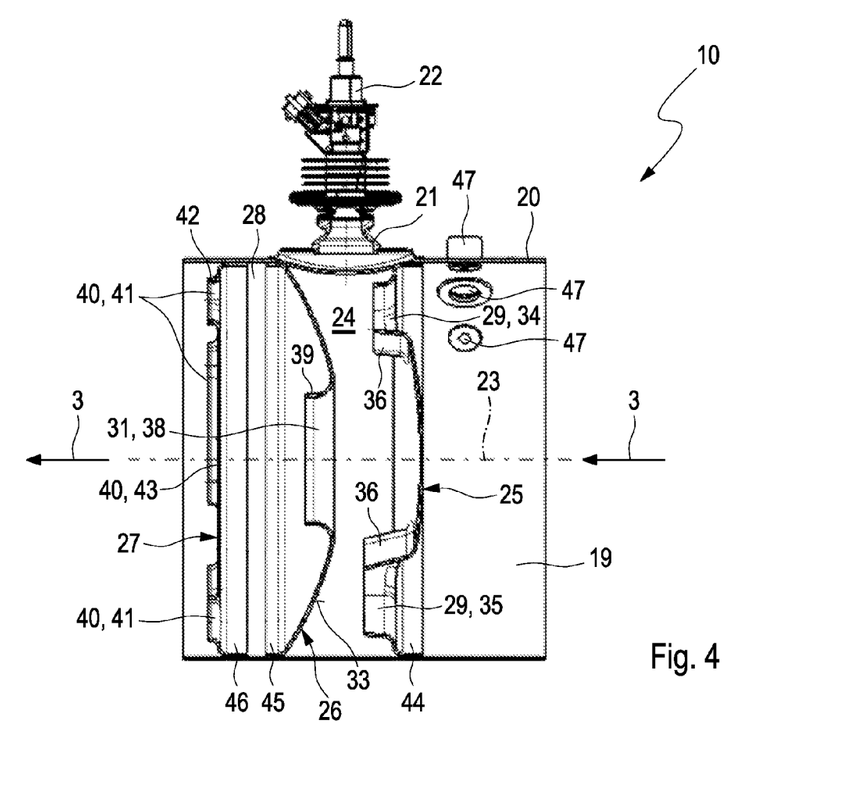
FIG. 4 is a longitudinal section of the injection section.
Figure 5:
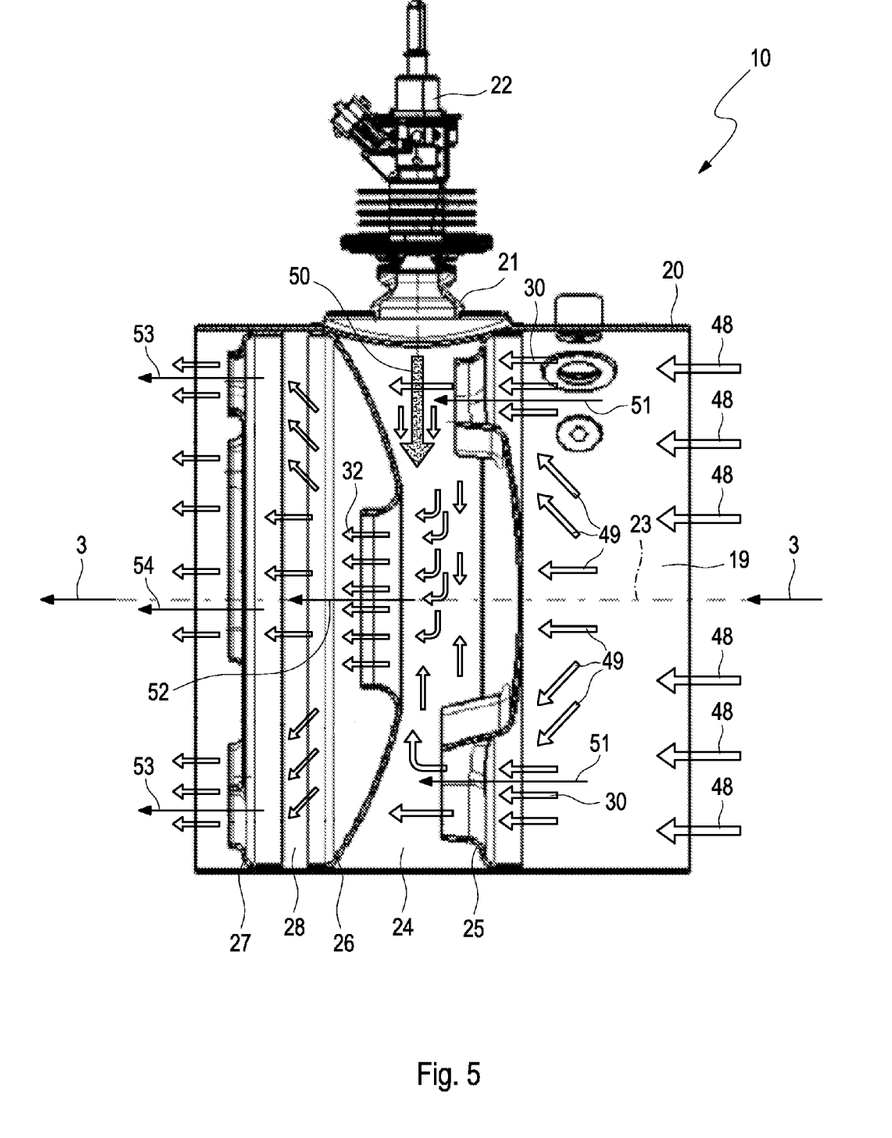
FIG. 5 is a longitudinal section of the injection section as in FIG. 4, however with flow arrows.

As is evident in particular from the FIGS. 3 to 5, the injection section 10 comprises a channel 19 for conducting the exhaust gas flow 3. For this purpose, the injection section 10 is equipped with a pipe piece 20. The injection section 10 is practically configured as a separate unit and can be pre-assembled independently of the remaining exhaust gas aftertreatment device 1. Connection elements, via which the injection section 10 can be attached to the outlet section 4 respectively the inlet section 7 are not shown in the FIGS. 3 to 5. These connection elements can for example be flanges for realizing the abovementioned clamp connection 18.

The injection section 10 additionally comprises an injector connection 21 arranged laterally on the channel 19, on which an injector 22 for introducing a fluid, that is a liquid or a gas, into the exhaust gas flow 3 is connected. In the shown example, the injector 22 is connected to the injector connection 21 so that its injection direction is orientated substantially perpendicularly or radially to a longitudinal center axis 23 of the channel 19. The longitudinal center axis 23 of the channel 19 coincides with the longitudinal center axis 13 of the housing 2 when the injection section 10 is installed in the housing 2.

In the channel 19, an injection chamber 24 is formed in the region of the injector connection 21. The injection chamber 24 is delimited, on the one side, by a first separating wall 25, which with respect to the exhaust gas flow 3 is arranged upstream in the channel 19, and on the other side, by a second separating wall 26, which with respect to the exhaust gas flow 3 is arranged downstream in the channel 19. The first separating wall 25 and the second separating wall 26 are perforated so that each can be flowed through by exhaust gas. In the preferred example shown here, a third separating wall 27 is additionally arranged in the channel 19 downstream of the second separating wall 26, which together with the second separating wall 26 delimits a deflection chamber 28. The third separating wall 27 is also perforated, so that it can be flowed through by exhaust gas.

The first separating wall 25 preferentially comprises a perforation configuration 29, which is configured so that the first separating wall 25 with respect to the longitudinal center axis 23 can be flowed through by exhaust gas exclusively eccentrically. Such an eccentric through-flow of the first separating wall 25 is indicated in FIG. 5 by arrows 30. Furthermore, the through-flow of the first separating wall 25 here takes place exclusively axially, that is parallel to the longitudinal center axis 23. Accordingly, an entering main part of the exhaust gas flow 3 marked 51 in FIG. 5 exclusively enters the injection chamber 24 axially and eccentrically.

In the example with exclusive eccentric through-flow of the first separating wall 25, the entering main part 51 corresponds to the entire exhaust gas flow 3.

The second separating wall 26 preferentially comprises a perforation configuration 31, which is configured so that the second separating wall 26 with respect to the longitudinal center axis 23 can be flowed through by exhaust gas exclusively concentrically. Such a concentric through-flow of the second separating wall 26 is indicated in FIG. 5 by arrows 32. Furthermore, the through-flow of the second separating wall 26 in this case takes place exclusively axially, that is parallel to the longitudinal center axis 23. Accordingly, an exiting main part of the exhaust gas flow 3 marked 52 in FIG. 5 exits the injection chamber 24 exclusively axially and eccentrically. In the example with exclusive concentric through-flow of the second separating wall 26, the exiting main part 52 corresponds to the entire exhaust gas flow 3.

The eccentric perforation configuration 29 of the first separating wall 25 and the concentric perforation configuration 31 of the second separating wall 26 in this case are preferentially additionally matched to one another so that in an axial projection, which is orientated parallel to the longitudinal center axis 23, no overlap between these perforation configurations 29, 31 arises. Accordingly, the eccentric perforation configuration 29 of the first separating wall 25 in the axial position is completely arranged outside the concentric perforation configuration 31 of the second separating wall 26.

The second separating wall 26 comprises a baffle surface 33 that is arranged eccentrically with respect to the longitudinal center axis 23, which is arranged in an axially orientated manner with respect to the eccentric perforation configuration 29 of the first separating wall 25. Furthermore, the second separating wall 26 is convexly curved towards the first separating wall 25. As a consequence, the baffle surface 33 is curved in cross section. In addition, the baffle surface 33 extends annularly closed about the central perforation configuration 31.

Figure 6:
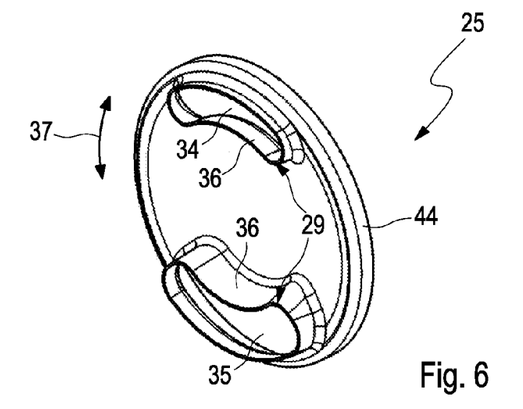
FIG. 6 is an isometric view of a first separating wall.

According to the FIGS. 4, 5 and 6, the eccentric perforation configuration 29 of the first separating wall 25 in the example shown comprises exactly two eccentrically arranged openings, namely a first eccentric opening 34 and a second eccentric opening 35. The two openings 34, 35 are arranged on the first separating wall 25 diametrically opposite with respect to the longitudinal center axis 23. The entering main part 51 of the exhaust gas flow 3 is thus divided over these two eccentric openings 34, 35. As evident from the FIGS. 4 and 5, the injector connection 21 and the two eccentric openings 34, 35 of the first separating wall 25 lie in a longitudinal center plane, in which the longitudinal center axis 23 is also located and which in the FIGS. 4 and 5 corresponds to the section plane. Accordingly, the first opening 34 is arranged proximally with respect to the injector connection 21 and is also called proximal opening 34 in the following. The second opening 35, by contrast, is arranged distally with respect to the injector connection 21 and is also called distal opening 35 in the following. The two eccentric openings 34, 35 preferably have a collar 36 each projecting into the injection chamber 24. In addition, both openings 34, 35 are configured as elongated holes the longitudinal direction of which is orientated in the circumferential direction 37 of the channel 19. Furthermore, it is evident, in particular from FIG. 6 that the distal eccentric opening 35 has a significantly larger opening cross section than the proximal eccentric opening 34. For example, the opening cross section of the distal opening 35 is at least twice as large as the opening cross section of the proximal opening 34. Finally, it is evident from FIGS. 4 to 6, that a length of the collar 36 of the distal opening 35 measured parallel to the longitudinal center axis 23 of the channel 19 is larger than the length of the collar 36 of the proximal opening 34, so that the collar 36 of the distal opening 35 projects more deeply into the injection chamber 24.

Figure 7:
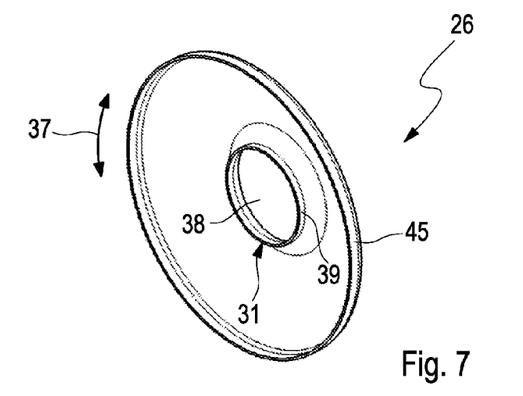
FIG. 7 is an isometric view of a second separating wall.
Figure 8:
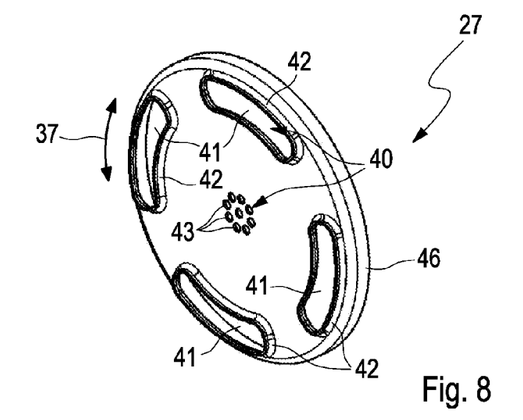
FIG. 8 is an isometric view of a third separating wall.

As is evident from the FIGS. 4, 5 and 7, the central perforation configuration 31 of the second separating wall 26 in the shown example comprises only a single concentrically or centrally arranged opening 38, which in the following is also called central opening 38. The exiting main part 52 of the exhaust gas flow 3 is thus conducted through this one central opening 38 in one part. The central opening 38 has an opening cross section which is geometrically similar to the cross section of the channel 19. Here, the channel 19 is formed cylindrical, in particular circle-cylindrical. Accordingly, the cross section of the central opening 38 is round, in particular circular. Here, too, a collar 39 is formed on the second separating wall 26, which encloses the central opening 38 and thereby projects orientated away from the injection chamber 34.

As is evident from the FIGS. 3, 4, 5 and 8, the third separating wall 27 also has a perforation configuration 40 which is configured so that the third separating wall 27 with respect to the longitudinal center axis 23 can be eccentrically flowed through by exhaust gas. To this end, the perforation configuration 40 of the third separating wall 27 comprises multiple eccentrically arranged openings 41, which are arranged evenly distributed in the circumferential direction 37. In the example, exactly four such eccentric openings 41 are provided. The eccentric openings 41 of the third separating wall 27 can each likewise be enclosed with a projecting collar 42 orientated away from the deflection chamber 28. Likewise, the eccentric openings 41 of the third separating wall 27 in this case are designed as elongated holes extending in the circumferential direction 37. In addition to this, the perforation configuration 40 of the third separating wall 27 is configured so that the third separating wall 27 cannot only be flowed through by exhaust gas eccentrically, but also concentrically. To this end, the perforation configuration 40 of the third separating wall 27 in the example of FIGS. 3 and 8 comprises multiple concentrically arranged openings 43 which in comparison with the eccentric openings 41 however have significantly smaller opening cross sections. In addition, no collars are provided with the concentric openings 43 in this case either. Furthermore, the concentric openings 43 are designed as circular openings. Accordingly, the perforation configuration 40 of the third separating wall 27 is such that a part of the exhaust gas flow 3 concentrically flowing through the third separating wall 27 is significantly smaller than a part of the exhaust gas flow 3 eccentrically flowing through the third separating wall 27. In the embodiment shown here, a main part 53 of the exhaust gas flow 3, during the operation of the exhaust gas aftertreatment device 1 according to FIG. 5, eccentrically exits the deflection chamber 28 through the eccentric openings 41 while a significantly smaller secondary part 54 of the exhaust gas flow 3 concentrically exits the deflection chamber 28 through the concentric openings 43.

As is evident from the FIGS. 3 to 5, the pipe piece 20 thus contains the channel 19, the injection chamber 24 and the deflection chamber 28. Furthermore, the first separating wall 25, the second separating wall 26 and the third separating wall 27 are arranged in the pipe piece 20 and fastened thereon. Practically, the respective separating wall 25, 26, 27 for this purpose comprises an axially projecting, annularly surrounding collar 44 respectively 45 respectively 46, which radially lies against an inside of the pipe piece 20 and for example is welded or soldered therewith.

Furthermore, the pipe piece 20 comprises the injector connection 21. In addition, further connections 47 for sensors and the like can be provided on the pipe piece 20.

The injection section 10 according to FIG. 5 functions as follows. The exhaust gas flow 3 is fed to the first separating wall 25 over the entire cross section of the channel 19 according to arrows 48. On the first separating wall 25, a deflection of the exhaust gas flow 3 according to arrows 49 to the eccentric perforation configuration 29 of the first separating wall 25 takes place. Because of this, an eccentric through-flow of the first separating wall 25 according to arrows 30 is created, which flows into the injection chamber 24. Here, the exhaust gas flow strikes the baffle wall 33, which deflects the flow to the outside. Because of the two eccentric openings 34, 35 of the eccentric perforation configuration 29 of the first separating wall 25 which are located diametrically opposite, a flow deflection in circumferential direction 37 additionally takes place. This produces intensive swirling-up within the injection chamber 24. With the help of the injector 22, the respective fluid according to arrows 50, preferentially a watery urea solution, is injected into the injection chamber 24. This injection usually takes place in the form of a spray cone which diverges in injection direction. A main injection direction in this case can be radially orientated to the longitudinal center axis 23. Finally, a central outlet flow according to arrows 32 is formed in the center of the injection chamber 24, which, through the concentric perforation configuration 31 of the second separating wall 26, enters the deflection chamber 28. In the deflection chamber 28, a renewed flow deflection or division over the eccentrically arranged openings 41 and the concentrically arranged openings 41 takes place. Accordingly, further intensive mixing-through takes place within the deflection chamber 28.

In the example of FIG. 1, homogenization of the exhaust gas flow 3 via the entire flow cross section of the housing 2 can take place in the calming chamber 14 which follows the third separating wall 27, before the exhaust gas flow 3 enters the SCR-catalytic converter 11.

While specific embodiments of the invention have been shown and described in detail to illustrate the application of the principles of the invention, it will be understood that the invention may be embodied otherwise without departing from such principles.

What is claimed is:

1. An injection section for an exhaust system of an internal combustion engine, the injection section comprising:
   a channel for conducting an exhaust gas flow;
   an injector connection arranged laterally on the channel, on which an injector for introducing a fluid into the exhaust gas flow can be connected; and
   an injection chamber formed in the channel in a region of the injector connection, the injection chamber being delimited by a perforated first separating wall through which exhaust gas can flow and which, with respect to the exhaust gas flow, is arranged in the channel upstream of the injector connection and being delimited by a perforated second separating wall through which exhaust gas can flow and which, with respect to the exhaust gas flow, is arranged in the channel downstream of the injector connection, wherein:
   the first separating wall comprises a perforation configuration to provide a predominantly or exclusively eccentric exhaust gas flow through the first separating wall, with respect to a longitudinal center axis of the channel, whereby an entering main part of the exhaust gas flow eccentrically enters the injection chamber; and
   the second separating wall comprises a perforation configuration to provide a predominantly or exclusively concentric exhaust gas flow through the second separating wall, with respect to a longitudinal center axis of the channel, whereby an exiting main part of the exhaust gas flow concentrically exits the injection chamber.

2. The injection section according to claim 1, wherein at least one of:
   the exhaust gas flow through the first separating wall is predominantly or exclusively axially directed, whereby the entering main part of the exhaust gas flow eccentrically and axially enters the injection chamber; and
   the exhaust gas flow through the second separating wall is predominantly or exclusively axially directed, whereby the exiting main part of the exhaust gas flow concentrically and axially exits the injection chamber.

3. The injection section according to claim 1, wherein the perforation configuration of the first separating wall, in a projection parallel to the longitudinal center axis of the channel, is completely arranged outside the concentric perforation of the second separating wall.

4. The injection section according to claim 1, wherein the second separating wall comprises a baffle surface that is axially aligned with respect to the perforation configuration of the first separating wall, which perforation configuration of the first separating wall is eccentrically arranged with respect to the longitudinal center axis of the channel.

5. The injection section according to claim 1, wherein the second separating wall is convexly curved towards the first separating wall.

6. The injection section according to claim 1, wherein at least one of:
   the perforation configuration of the first separating wall comprises at least one eccentrically arranged opening which is enclosed by a collar projecting into the injection chamber; and
   the perforation configuration of the first separating wall comprises at least one eccentrically arranged opening which is configured as an elongated hole extending in circumferential direction of the channel.

7. The injection section according to claim 1, wherein the perforation configuration of the first separating wall is formed by only two eccentrically arranged openings comprising a first opening and a second opening, which, with respect to the longitudinal center axis, is located diametrically opposite the first opening.

8. The injection section according to claim 7, wherein the first opening is arranged proximally with respect to the injection connection and the second opening is arranged distally with respect to the injection connection.

9. The injection section according to claim 1, wherein at least one of:
   the perforation configuration of the second separating wall comprises at least one centrally arranged opening which is enclosed by a projecting collar that is orientated away from the injection chamber; and
   the perforation of the second separating wall is only formed by a single concentrically arranged central opening.

10. The injection section according to claim 1, further comprising a deflection chamber formed in the channel downstream of the injection chamber, the deflection chamber being delimited by the second separating wall and by a perforated third separating wall through which exhaust gas can flow and which is arranged in the channel.

11. The injection section according to claim 10, wherein the third separating wall comprises a perforation configuration to provide an eccentric exhaust gas flow through the third separating wall, with respect to the longitudinal center axis of the channel.

12. The injection section according to claim 11, wherein in the perforation configuration of the third separating wall comprises at least one of:
   an eccentrically arranged opening with a projecting collar orientated away from the deflection chamber; and
   an elongated hole extending in a circumferential direction of the channel.

13. The injection section according to claim 11, wherein a part of exhaust gas flow which concentrically flows through the third separating wall is smaller than a part of the exhaust gas flow eccentrically flowing through the third separating wall.

14. The injection section according to claim 1, wherein the channel is formed by a pipe piece and the pipe partially delimits the injection chamber and the pipe comprises the injector connection and which with respect to an exhaust gas aftertreatment device, in which the injection section can be installed, the pipe is a separate component so that the injection section forms a unit that is separate with respect to the exhaust gas aftertreatment device.

15. The injection section according to claim 1, wherein the perforation configuration of the first separation wall and the perforation configuration of the second separation wall are positioned relative to each other in such a way that the exhaust gas flow within the injection chamber is free of swirl about a longitudinal center axis of the channel.

16. An exhaust gas aftertreatment device for an exhaust system of an internal combustion engine, the exhaust gas aftertreatment device comprising:
a tubular housing for conducting an exhaust gas flow, the tubular housing having an outlet section that contains an SCR-catalytic converter; and
an injection section comprising a channel for conducting an exhaust gas flow, an injector connection arranged laterally on the channel, on which an injector for introducing a fluid into the exhaust gas flow can be connected and an injection chamber formed in the channel in a region of the injector connection, the injection chamber being delimited by a perforated first separating wall through which exhaust gas can flow and which, with respect to the exhaust gas flow, is arranged in the channel upstream of the injector connection and being delimited by a perforated second separating wall through which exhaust gas can flow and which, with respect to the exhaust gas flow, is arranged in the channel downstream of the injector connection, wherein:
the first separating wall comprises a perforation configuration to provide a predominantly or exclusively eccentric exhaust gas flow through the first separating wall, with respect to a longitudinal center axis of the channel, whereby an entering main part of the exhaust gas flow eccentrically enters the injection chamber;
the second separating wall comprises a perforation configuration to provide a predominantly or exclusively concentric exhaust gas flow through the second separating wall, with respect to a longitudinal center axis of the channel, whereby an exiting main part of the exhaust gas flow concentrically exits the injection chamber; and
the injection section, with respect to the exhaust gas flow, is arranged upstream of the SCR-catalytic converter.

17. The exhaust gas aftertreatment device according to claim 16, wherein at least one of:
the exhaust gas flow through the first separating wall is predominantly or exclusively axially directed, whereby the entering main part of the exhaust gas flow eccentrically and axially enters the injection chamber; and
the exhaust gas flow through the second separating wall is predominantly or exclusively axially directed, whereby the exiting main part of the exhaust gas flow concentrically and axially exits the injection chamber.

18. The exhaust gas aftertreatment device according to claim 16, wherein the perforation configuration of the first separating wall, in a projection parallel to the longitudinal center axis of the channel, is completely arranged outside the concentric perforation of the second separating wall.

19. The exhaust gas aftertreatment device according to claim 16, wherein the second separating wall comprises a baffle surface that is axially aligned with respect to the perforation configuration of the first separating wall, which perforation configuration of the first separating wall is eccentrically arranged with respect to the longitudinal center axis of the channel.

20. The exhaust gas aftertreatment device according to claim 16, wherein at least one of:
the perforation configuration of the first separating wall comprises at least one eccentrically arranged opening which is enclosed by a collar projecting into the injection chamber; and
the perforation configuration of the first separating wall comprises at least one eccentrically arranged opening which is configured as an elongated hole extending in circumferential direction of the channel.

21. The exhaust gas aftertreatment device according to claim 16, wherein:
the perforation configuration of the first separating wall is formed by only two eccentrically arranged openings comprising a first opening and a second opening, which, with respect to the longitudinal center axis, is located diametrically opposite the first opening; and
the first opening is arranged proximally with respect to the injection connection and the second opening is arranged distally with respect to the injection connection.

* * * * *